US006988366B2

(12) United States Patent
Bryk et al.

(10) Patent No.: US 6,988,366 B2
(45) Date of Patent: Jan. 24, 2006

(54) GAS TURBINE AND METHOD FOR DAMPING OSCILLATIONS OF AN ANNULAR COMBUSTION CHAMBER

(75) Inventors: Roderich Bryk, Düren (DE); Otmar Gossmann, Engelskirchen (DE); Harald Höll, Wächtersbach (DE); Burkhard Voss, Dorsten (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/399,264

(22) PCT Filed: Oct. 5, 2001

(86) PCT No.: PCT/EP01/11511

§ 371 (c)(1), (2), (4) Date: Aug. 25, 2003

(87) PCT Pub. No.: WO02/33323

PCT Pub. Date: Apr. 25, 2002

(65) Prior Publication Data

US 2004/0025514 A1 Feb. 12, 2004

(51) Int. Cl.
*F02C 1/00* (2006.01)

(52) U.S. Cl. ............................ 60/772; 60/779; 60/725; 60/39.091

(58) Field of Classification Search .................. 60/772, 60/779, 796, 797, 798, 799, 800, 804, 725, 60/752, 753, 754, 39.091; 242/419.4, 154, 242/149; 403/DIG. 9; 180/68.3
See application file for complete search history.

(56) References Cited

U.S. PATENT DOCUMENTS

| | | | | | |
|---|---|---|---|---|---|
| 1,635,783 | A | * | 7/1927 | Goodall | 24/284 |
| 2,653,836 | A | * | 9/1953 | Christophersen et al. | 285/411 |
| 2,688,170 | A | * | 9/1954 | Balzer | 24/68 BT |
| 2,895,748 | A | * | 7/1959 | Oldham | 285/410 |
| 3,029,095 | A | * | 4/1962 | King et al. | 285/411 |
| 3,398,527 | A | * | 8/1968 | Taylor et al. | 60/752 |
| 3,600,770 | A | * | 8/1971 | Halling | 24/279 |
| 3,601,868 | A | * | 8/1971 | Elsner | 24/279 |
| 3,661,409 | A | * | 5/1972 | Brown et al. | 285/82 |
| 3,788,677 | A | * | 1/1974 | Stade et al. | 285/67 |
| 3,797,078 | A | * | 3/1974 | LaPointe | 24/279 |
| 3,903,693 | A | * | 9/1975 | Fox | 60/200.1 |
| 4,191,011 | A | * | 3/1980 | Sweeney et al. | 60/796 |
| 4,191,410 | A | * | 3/1980 | Voituriez et al. | 285/367 |
| 4,225,160 | A | * | 9/1980 | Ortloff | 285/123.2 |
| 5,018,768 | A | * | 5/1991 | Palatchy | 285/24 |
| 5,181,377 | A | * | 1/1993 | Napoli et al. | 60/796 |
| 5,392,596 | A | * | 2/1995 | Holsapple et al. | 60/800 |
| 5,499,499 | A | * | 3/1996 | Ambrogi et al. | 60/800 |
| 5,509,702 | A | * | 4/1996 | Warehime et al. | 285/409 |
| 5,557,920 | A | * | 9/1996 | Kain | 60/39.23 |
| 5,572,863 | A | * | 11/1996 | Wrightham et al. | 60/39.37 |
| 5,645,303 | A | * | 7/1997 | Warehime et al. | 285/409 |
| 5,675,873 | A | * | 10/1997 | Groess | 24/284 |
| 5,707,089 | A | * | 1/1998 | Fend | 285/411 |
| 5,868,442 | A | * | 2/1999 | Lin | 285/367 |
| 5,873,611 | A | * | 2/1999 | Munley et al. | 285/367 |
| 6,098,397 | A | * | 8/2000 | Glezer et al. | 60/772 |
| 6,499,773 | B1 | * | 12/2002 | Ostergaard | 285/408 |
| 2002/0088233 | A1 | * | 7/2002 | Ohnishi et al. | 60/725 |
| 2004/0134199 | A1 | * | 7/2004 | Manteiga et al. | 60/796 |

FOREIGN PATENT DOCUMENTS

| | | |
|---|---|---|
| DE | 3539903 | 5/1987 |
| DE | 4339094 | 5/1995 |
| DE | 19711337 | 9/1998 |
| EP | 0509801 | 4/1992 |
| JP | 60200022 | 10/1985 |

* cited by examiner

*Primary Examiner*—William H. Rodriguez
(74) *Attorney, Agent, or Firm*—Harness, Dickey & Pierce, P.L.C.

(57) ABSTRACT

A gas turbine includes an annular combustion chamber and an outer wall of an annular combustion chamber. A straining ring is arranged on the outer wall of the annular combustion chamber and enables oscillations of the outer wall to be damped via friction. The effects of combustion oscillations produced by damaging vibrations of the annular combustion chamber are thus reduced. A method is further for damping an oscillation of an outer wall of an annular combustion chamber.

12 Claims, 4 Drawing Sheets

GAS TURBINE AND METHOD FOR DAMPING OSCILLATIONS OF AN ANNULAR COMBUSTION CHAMBER

This application is the national phase under 35 U.S.C. § 371 of PCT International Application No. PCT/EP01/11511 which designated the United States of America and which claims priority on European Patent Application number EP 00122554.9 filed Oct. 16, 2000, the entire contents of which are hereby incorporated herein by reference.

FIELD OF THE INVENTION

The invention generally relates to a gas turbine with a compressor, with an annular combustion chamber and with a turbine part. The invention also generally relates to a method for the damping of oscillations of an annular combustion chamber of a gas turbine.

BACKGROUND OF THE INVENTION

DE 43 39 094 A describes a method for the damping of thermoacoustic oscillations in the combustion chamber of a gas turbine. During the combustion of fuels in the combustion chamber of a stationary gas turbine, an aircraft or the like, the combustion processes may result in instabilities or pressure fluctuations which, under unfavorable conditions, excite thermoacoustic oscillations which are also called combustion oscillations. These not only constitute an undesirable sound source, but may lead to inadmissibly high mechanical loads on the combustion chamber. Such thermoacoustic oscillation is actively damped in that the location of the heat release fluctuation associated with combustion is controlled by the injection of a fluid.

SUMMARY OF THE INVENTION

An object of an embodiment of the invention is to specify a gas turbine with an annular combustion chamber which is particularly robust with respect to combustion oscillations. A further object of an embodiment of the invention is to specify a method for damping the oscillation of an annular combustion chamber of a gas turbine.

According to an embodiment of the invention, the object directed at a gas turbine may be achieved by a gas turbine with a compressor, with an annular combustion chamber and with a turbine part being specified. The annular combustion chamber preferably includes an outer wall with an outer surface, and the annular combustion chamber is preferably surrounded on its outer surface by a tension ring.

Conventional measures against the action of combustion oscillations were all measures which attempted actively or passively to reduce the combustion oscillation itself in terms of its amplitude. Here, active measures are, for example, the antiphase modulation of supplied fuel or antiphase acoustic irradiation by means of a loud speaker. Passive measures attempt, by a change in the acoustic boundary conditions of the combustion chamber, to achieve acoustic detuning, in such a way that combustion oscillations of specific frequencies are damped. The active measures contain a high outlay in terms of apparatus and are not always effective. The passive measures, as a rule, can damp only specific frequency ranges. It is virtually impossible, precisely in an annular combustion chamber, to calculate and forecast acoustic resonances at which a stable combustion oscillation builds up.

The proposed gas turbine is distinguished by an entirely novel attempt to reduce the effects of a combustion oscillation. The annular combustion chamber is surrounded by a tension ring which clamps around the outer wall of the annular combustion chamber. By such a tension ring, the harmful vibration of the annular combustion chamber can then be damped by the oscillation energy being dissipated to the tension ring. Moreover, the tension ring affords the possibility of damping any frequency ranges particularly efficiently by the setting of a defined pretension. Thus, a higher tension force is selected for the controlled damping of higher oscillation frequencies than for the damping of low frequencies.

By an automated tension force setting by way of a suitable drive, even an in-situ change in the tension force may take place during the operation of the gas turbine. Thus, in each case, oscillation modes just occurring in the annular combustion chamber wall are damped particularly efficiently by the setting of the tension force in the tension ring.

a) Preferably, the outer surface has a cylindrical contact face, on which the tension ring lies. By such a cylindrical contact face, the tension ring comes to lie in a slip-free manner. Since the tension ring force acts radially inward, there is otherwise the risk of the tension ring slipping off on a sloping bearing face. Also preferably, the cylindrical contact face is formed by a rib running in the circumferential direction.

b) Preferably, the tension ring is constructed from at least two tension ring segments along its circumferential direction. This allows a simplified mounting of the tension ring. Also preferably, the tension ring segments are connected by use of a tension device. This tension device serves for setting a pretension in the tension ring and consequently, in particular, also for setting a tension force particularly suitable for dissipating the energy of specific oscillation forms.

c) Preferably, the tension ring has a recess such that it lies on the rib so as at least partially to surround the rib by way of the recess. This leads to a further-improved bearing protection for the tension ring.

d) Preferably, the tension device has a pull rod which engages into a pull lug, a pretensioning force being set between the pull rod and the pull lug by means of a spring. Also preferably, the pull lug is arranged displaceably in long holes.

The statements according to features a) to c) may also be combined with one another in any way.

According to an embodiment of the invention, an object directed at a method may be achieved by a method for the damping of oscillations of an annular combustion chamber of a gas turbine being specified, in which, by the setting of a tension force on a tension ring running around the outer circumference of the annular combustion chamber, a dissipation of oscillation energy of the annular combustion chamber as a result of friction on the tension ring and consequently the damping of the oscillation are induced.

The advantages of such a method may arise correspondingly from the above statements relating to the advantages of the gas turbine.

Preferably, the tension force is set so as to be tuned to a prevailing oscillation frequency.

BRIEF DESCRIPTION OF THE DRAWINGS

The invention is explained in more detail, by way of example, with reference to the drawing in which, partially diagrammatically and not true to scale.

Identical reference symbols have the same significance in the various figures.

DETAILED DESCRIPTION OF THE PREFERRED EMBODIMENTS

Figure 1:
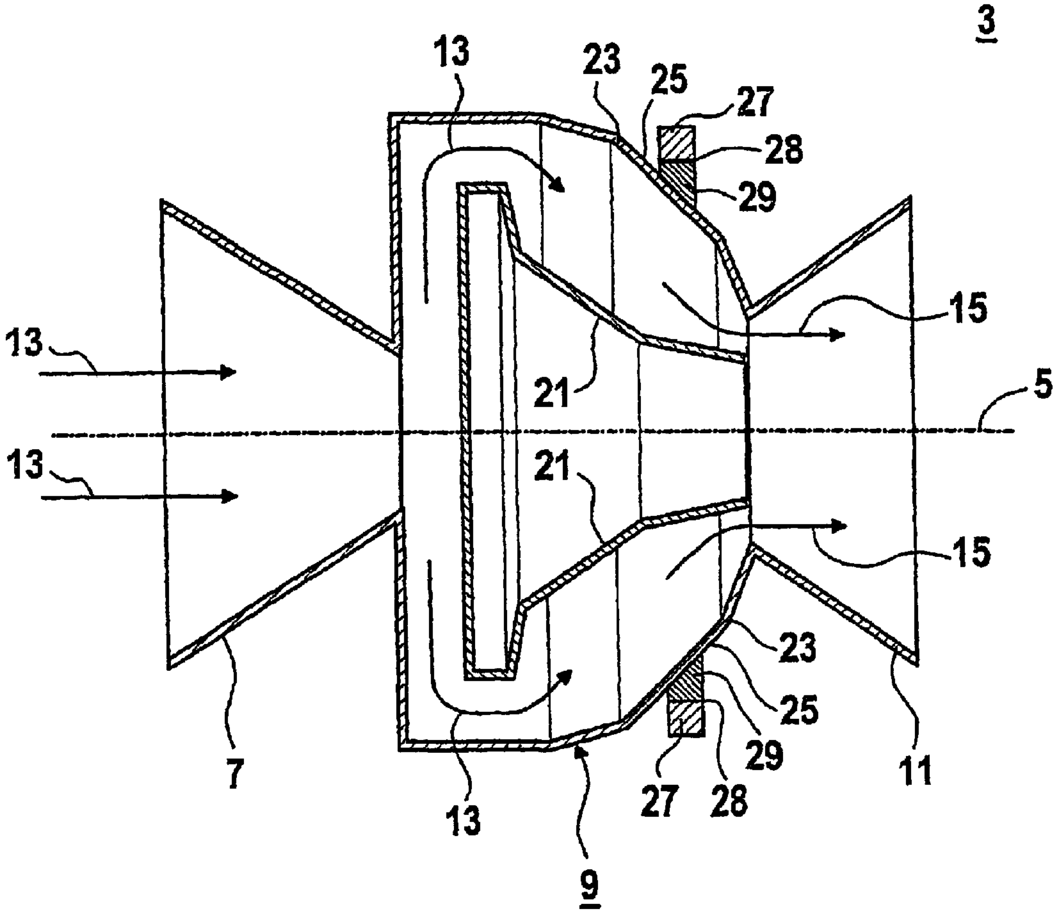
FIG. 1 shows a gas turbine.

FIG. 1 shows diagrammatically a gas turbine 3 in a longitudinal section. The gas turbine 3 is directed along an axis 5 and has, connected one behind the other, a compressor 7, an annular combustion chamber 9 and a turbine part 11. Air 13 is sucked in and highly compressed by the compressor 7. The highly compressed air 13 is delivered to the annular combustion chamber 9. There, it is burnt, with fuel being added. The hot exhaust gas 15 which occurs is delivered to the turbine part 11. The annular combustion chamber 9 has an outer wall 23 with an outer surface 25. On the outer surface 25 runs in the circumferential direction a rib 29 which has, lying radially on the outside, a cylindrical contact face 28. A tension ring 27 surrounding the annular combustion chamber 9 lies on the cylindrical contact face 28.

During combustion, flame instabilities may occur in the annular combustion chamber 9 and result, in turn, in pressure pulsations in the annular combustion chamber 9. The pressure pulsations reflected by the annular combustion chamber wall are also reflected back to the combustion location. There, if the phase relationship is correct, they may reinforce flame instabilities in such a way that the build-up of a stable combustion oscillation by means of the fed-back system occurs. This combustion oscillation may be so considerable that damaging vibrations are built up in the gas turbine 3.

In particular, the annular combustion chamber 9 is exposed to these vibrations. The vibrations are also transmitted to the ribs 29 and lead to a friction of the tension ring 27 on the cylindrical contact face 28. Oscillation energy of the annular combustion chamber oscillation is thereby converted into heat and the oscillation is consequently damped. Moreover, the tension ring 27 requires no external supporting points, that is to say there is no need for any external compensation of thermally induced relative movements.

This is particularly important if external supporting points were to assume, even only temporarily, a markedly different temperature level from that of the structure to be damped. In this case, it would not be possible to compensate the expansion differences at a justifiable outlay. The friction of the tension ring 27 on the rib 29 occurs due to the fact that the neutral fibers of the rib 29, on the one hand, and of the tension ring 27, on the other hand, lie on different diameters. If, then, excitations to oscillation and consequently elastic deformations, for example ovalizations, of the outer wall 23 occur during operation, the tension ring 27 follows this deformation, the radius of curvature of the contact face 28 changing cyclically.

In the event of a reduction in the radius of curvature, there is a prolongation of the outer material fibers of the rib 29 which lie nearer to the contact face 28. In contrast to this, the marginal fibers of the tension ring 27 which lie near the contact face 28 are compressed in the longitudinal direction.

The superposition of the two effects results in a relative movement which is counteracted by a frictional resistance at the contact face 28. Since the strength of the components involved is sufficiently high, the frictional resistance is overcome, energy being extracted from the oscillating system as a result of the friction on the contact face 28. This leads to the desired damping of the oscillation of the outer wall 23.

As compared with methods which bring about a suppression of the causal combustion oscillation, the damping via the tension ring 27 leads to a damping of all the oscillation modes in the outer wall 23. Moreover, specific oscillation modes can be damped in a controlled manner by the setting of a circumferential pretension in the tension ring 27. The construction of the tension ring 27 is explained in more detail with reference to the following figure.

Figure 2:
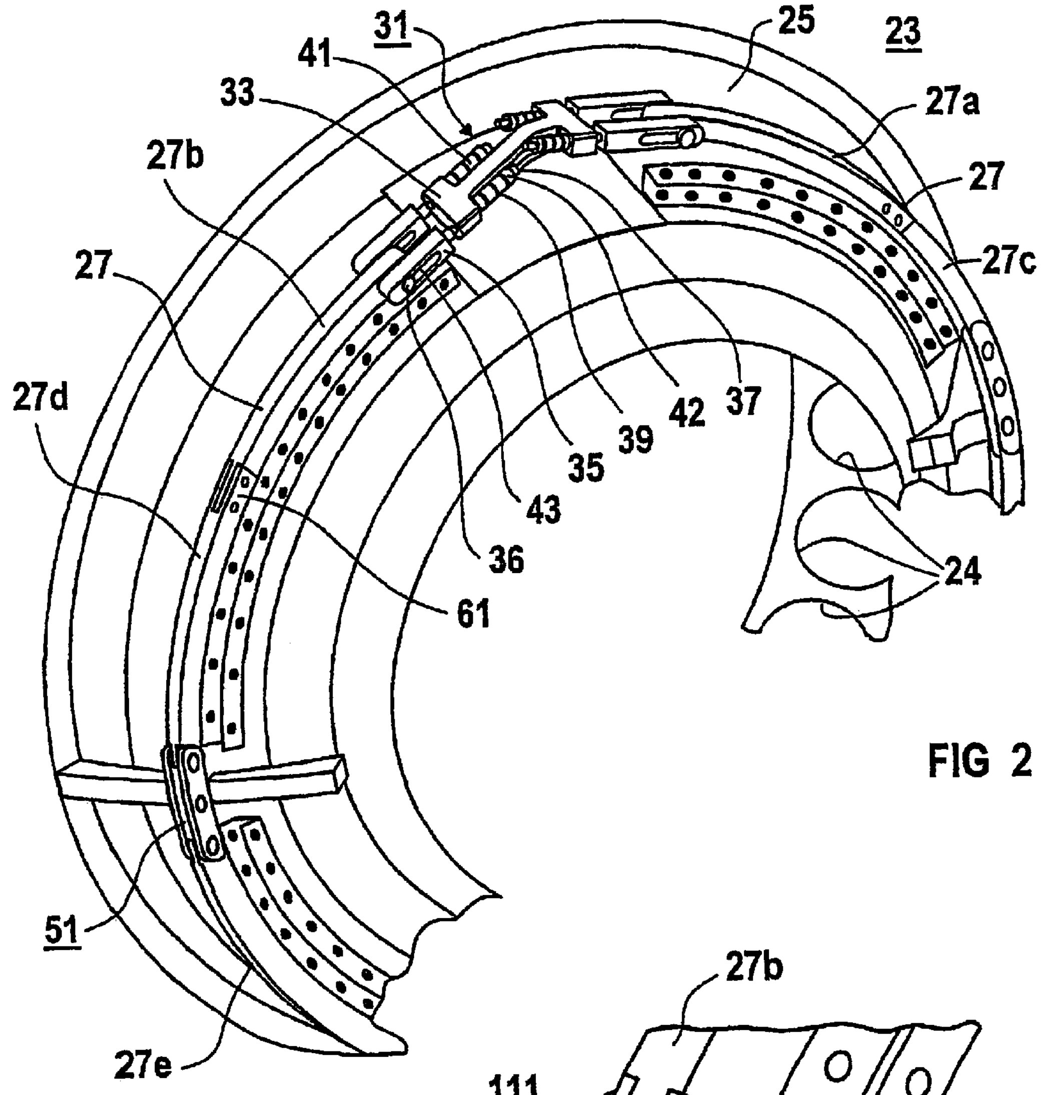
FIG. 2 shows an outer wall of an annular combustion chamber with a tension ring.
Figure 7:
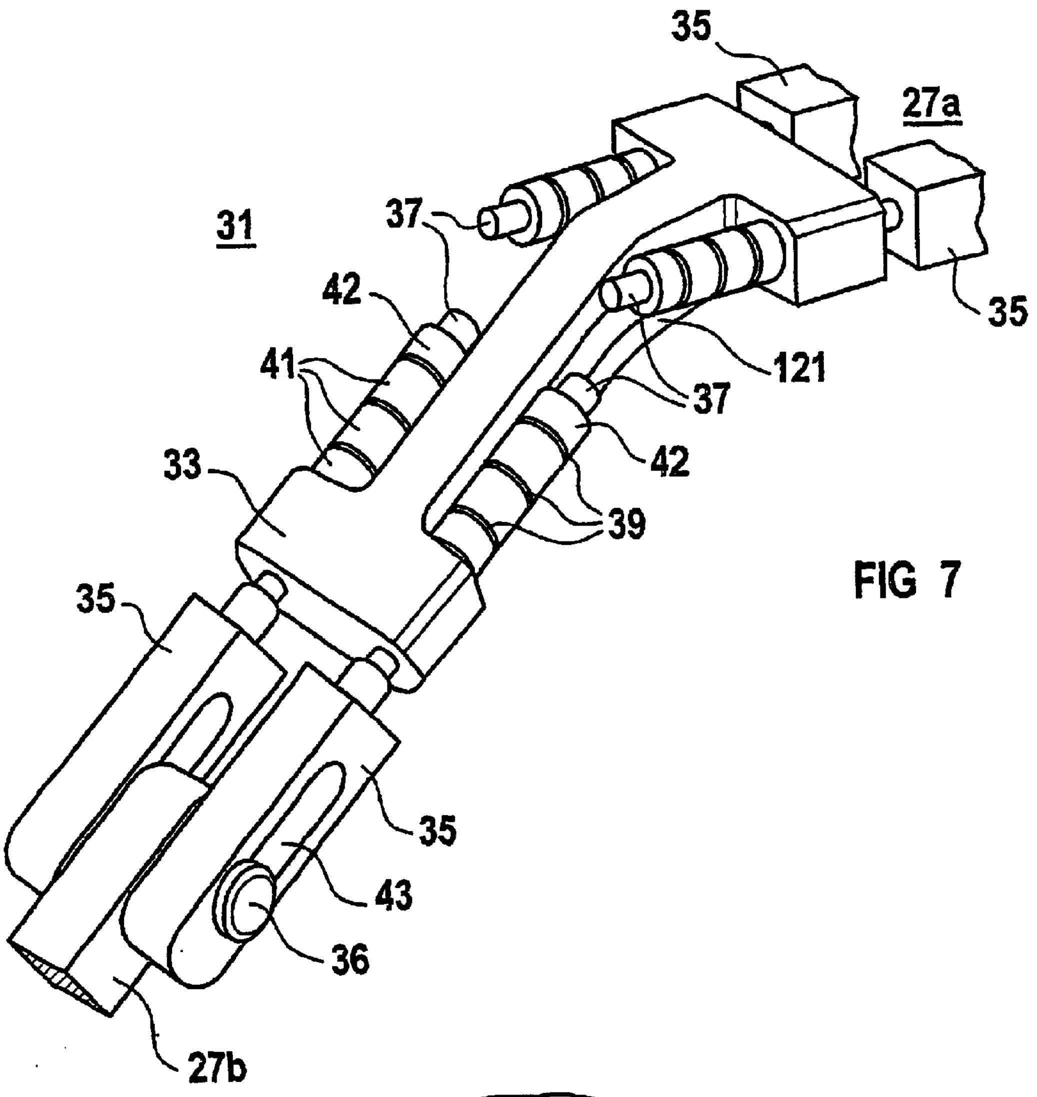
FIG. 7 shows a tension device.

FIG. 2 shows part of an outer wall 23 of an annular combustion chamber 9. The outer wall 23 is surrounded by a tension ring 27. The tension ring 27 is constructed from individual tension ring segments 27*a*, 27*b*, 27*c*, 27*d*, 27*e*. Two of the tension ring segments 27*a*, 27*b* are connected via a tension device 31. The tension device 31 has a bridge-like strap 33. Two pairs of pull rods 37 lead through this bridge-like strap. A pair of pull rods 37 is in engagement in each case with a pair of pull lugs 35. The pull rods 37 are held in a strap 33 in each case so as to be pretensionable via a plurality of nuts 41 and cup springs 39 located between these. A superbold nut 42 in each case closes off a cup spring column. Each pull lug 35 has a long hole 43, by which it is connected displaceably in the circumferential direction to one of the tension ring segments 27*a*, 27*b* via a jointed pin 36. The more detailed construction of the tensioning device 31 is also illustrated, enlarged, in FIG. 7.

Further segment connections are illustrated in more detail in the following figures.

Figure 3:
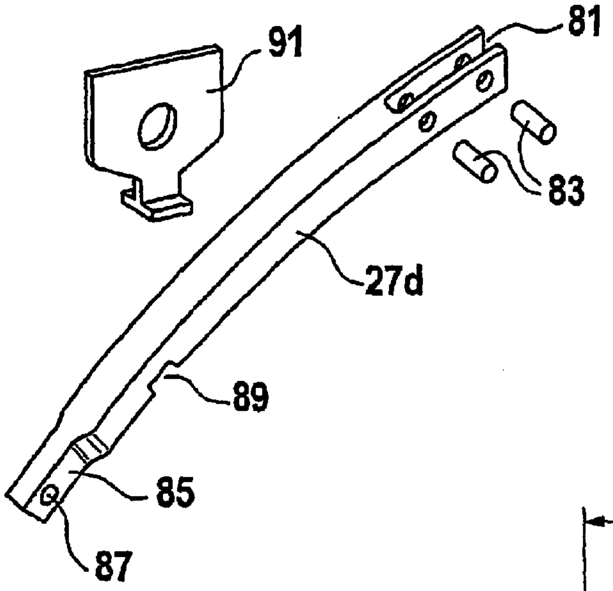
FIG. 3 shows a tension ring segment with a securing lug.

FIG. 3 shows a tension ring segment 27*d*. The tension ring segment 27*d* has, at one end, a recess 81, by which it can be connected to an adjacent tension ring segment via bolts 83. On the other side of the tension ring segment, it is likewise possible to have a connection to an adjacent tension ring segment via a narrowing 85 of the tension ring segment thickness and a bore 87. These two types of connection are explained in more detail later. The tension ring segment 27*d* has an engagement groove 89 which is in engagement with a guide bracket 91 during the mounting of the tension ring segment 27*d*. The guide bracket 91 allows a positive guidance of the tension ring segment 27*d* along the circumference during mounting. In the lower part of the outer wall 23, the guide brackets 91 prevent the tension ring segment 27*d* from pivoting away during mounting. This measure is, of course, also used in the other tension ring segments in the lower part of the outer wall 23.

Figure 4:
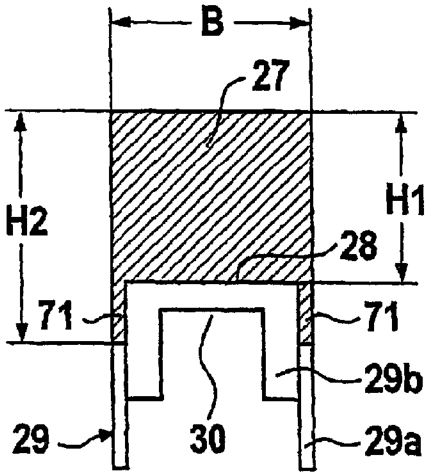
FIG. 4 shows, in cross section, a tension ring seated on a rib.

FIG. 4 shows, in a cross section, how the tension ring 27 is seated on the rib 29. The tension ring 27 has a recess 30 on its underside. The recess 30 is formed by two webs 71 located on the underside of the tension ring 27 on the outside in the axial direction and running in the circumferential direction. The webs 71 engage around the rib 29. The rib 29 is in this case formed from two axially spaced rib webs 29*a* which run around in a circumferential direction and between which is fastened, offset upward in the radial direction, a u-shaped carrying part 29*b* which is open downward in the radial direction. The u-shaped carrying part 29*b* has the contact face 28 on its radially outer surface. The tension ring 27 has a width of about 70 mm in the axial direction. The height of the tension ring 27 in the radial direction, including the extensions 71 enclosing the rib 29, amounts to about 80 mm, while the radial height H1 of the tension ring 27 without the extensions 71 amounts to about 60 mm.

Figure 5:
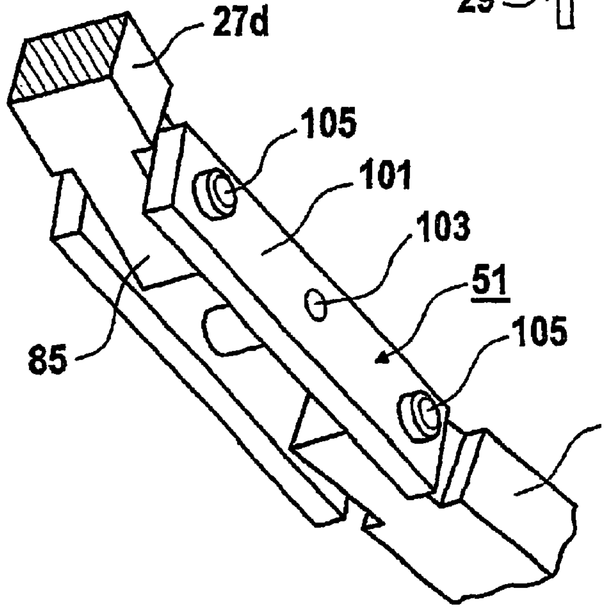
FIG. 5 shows the connection of two tension ring segments.

FIG. 5 shows a segment connection, designed as a coupling member 51, between two tension ring segments 27*d*, 27*e*. The coupling member 51 has two elongately rectangular side parts 101. The side parts 101 are connected to a central bolt 103. A tension ring segment 27*d* is inserted with its thick narrowing 85 between the side parts 101 between one end of the side parts 101. A coupling bolt 105 leads through the side parts 101 and through the bore 87 of the tension ring segment 27*d*.

The tension ring segment 27*e* is fastened on the other side of the coupling member 51 in the same way. The coupling member 51 allows a rotatability of the tension ring segments 27*d*, 27*e* in relation to one another and also allows a simple releasability of this connection point. The coupling member 51 is inserted, in particular, via a parting line of the outer wall 23, in order to make it possible to open the annular combustion chamber 9, instead of demounting the tension ring 27.

Figure 6:
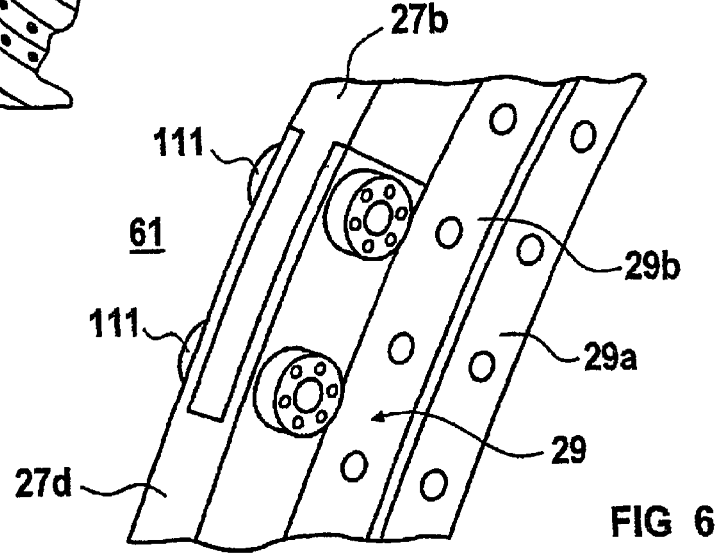
FIG. 6 shows a further connection of two tension ring segments.

FIG. 6 shows a further connection between two tension ring segments 27*b*, 27*d*. The tension ring segments are in this case inserted one into the other in the circumferential direction and are secured by means of continuous connecting bolts 111.

Figure 8:
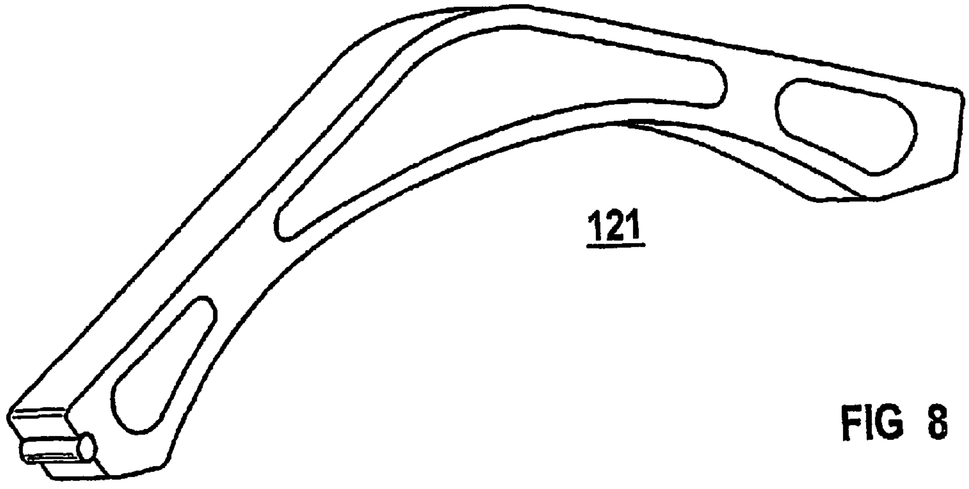
FIG. 8 shows a bridge of the tension device.

FIG. 7 shows once again, in detail, the tension device 31 already described. Additionally illustrated is a long hole for the bridge 121 which spans the annular combustion chamber 9 and which connects the tension ring segments 27*a*, 27*b*. The bridge 121 is illustrated in detail in FIG. 8.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A gas turbine, comprising:

a compressor;

an annular combustion chamber; and a turbine part, wherein the annular combustion chamber includes an outer wall with an outer surface, wherein the annular combustion chamber is surrounded on its outer surface by a tension ring that has no external supporting points, and wherein the tension ring includes a tension device that places a pretension on the tension ring to achieve a friction between the tension ring and the annular combustion chamber suitable for dissipating oscillation energy.

2. The gas turbine as claimed in claim 1, wherein the outer surface includes a cylindrical contact face, on which the tension ring is present.

3. The gas turbine as claimed in claim 2, wherein the cylindrical contact face is formed by a rib running in the circumferential direction.

4. The gas turbine as claimed in claim 3, wherein the tension ring includes a recess that lies on the rib.

5. The gas turbine as claimed in claim 1, wherein the tension ring is constructed from at least two tension ring segments along its circumferential direction.

6. The gas turbine as claimed in claim 5, wherein the tension ring segments are connected via the tension device.

7. The gas turbine as claimed in claim 6, wherein the tension device includes a pull rod, adapted to engage into a pull lug, and wherein a pretensioning force is set between the pull rod and the pull lug via a spring.

8. The gas turbine as claimed in claim 7, wherein the pull lug is arranged displaceably in long holes.

9. A method for the damping of oscillations of an annular combustion chamber of a gas turbine, comprising:

providing a tension ring around an outer circumference of the annular combustion chamber, the tension ring having no external supporting points; and dissipating oscillation energy of the annular combustion chamber via friction between the tension ring and the annular combustion chamber by setting a tension force on the tension ring.

10. The method as claimed in claim 9, wherein the tension force is set so as to be tuned to a prevailing oscillation frequency.

11. An apparatus for the damping of oscillations of an annular combustion chamber of a gas turbine, comprising:

a tension ring running around an outer circumference of the annular combustion chamber;

wherein the tension ring has no external supporting points; and wherein the tension ring includes means for setting a tension force of the tension ring to achieve a dissipation of oscillation energy of the annular combustion chamber.

12. The apparatus as claimed in claim 11, wherein the tension force is set so as to be tuned to a prevailing oscillation frequency.

* * * * *